Oct. 14, 1969   J. P. KRYSTOF   3,471,898
APPARATUS FOR EXTRUDING PLASTIC STRIPS
Filed Nov. 9, 1966   3 Sheets-Sheet 1
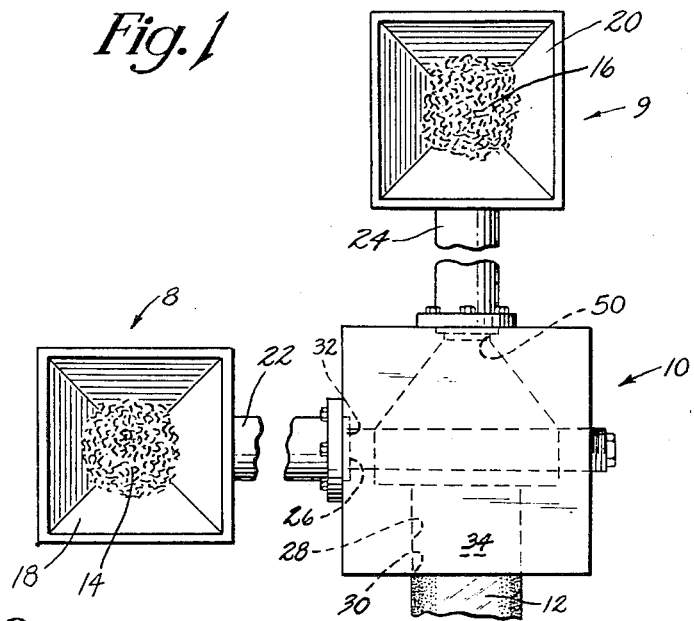
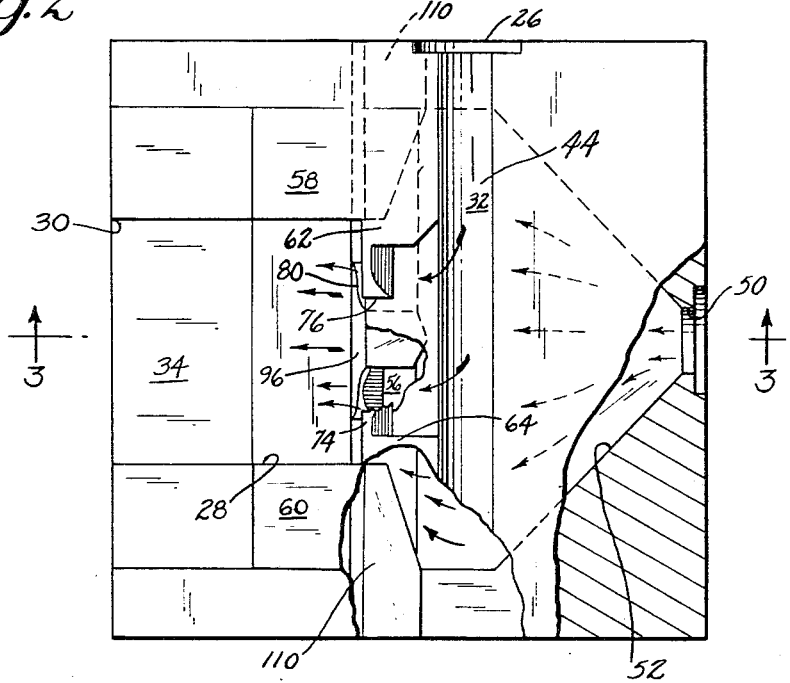
INVENTOR.
Joseph P. Krystof
BY
ATTORNEYS Oct. 14, 1969        J. P. KRYSTOF         3,471,898
APPARATUS FOR EXTRUDING PLASTIC STRIPS
Filed Nov. 9, 1966                3 Sheets-Sheet 3

United States Patent Office 3,471,898
Patented Oct. 14, 1969

3,471,898
APPARATUS FOR EXTRUDING PLASTIC STRIPS
Joseph P. Krystof, Kensington, Conn., assignor to Tectonic Industries, Incorporated, East Berlin, Conn., a corporation of Connecticut
Filed Nov. 9, 1966, Ser. No. 593,165
Int. Cl. B29f 3/12
U.S. Cl. 18—13                              9 Claims

ABSTRACT OF THE DISCLOSURE

An apparatus for extruding a continuous strip of multicolor plastic material including a die provided with removable inserts arranged to restrict and divert flow of plastic material therethrough to form a multicolor strip having a predetermined color pattern.

---

This invention relates to the manufacture of strips of sheet material and deals more particularly with apparatus for extruding such strips made of multicolor plastic material which will flow at elevated temperatures but which is normally rigid at room temperature.

It is an object of the present invention to provide apparatus for extruding continuous strips of multicolor plastic material of generally rectangular cross-sectional configuration in which the arrangement of colors is of a predetermined pattern.

Another object of the invention is to provide such an apparatus including a die provided with removable inserts arranged to restrict and to divert the flow of plastic material therethrough in a manner to provide a multicolor strip of plastic material having a predetermined color pattern.

Another object is to provide such an apparatus in which the configuration of the inserts and their arrangement in the die permit overlapping merger of multiple streams of molten plastic material to form a single unitary strip of multicolor material which is substantially rigid when cooled to room temperature.

The drawings show a preferred embodiment of the invention and such embodiment will be described but it will be understood that various changes may be made from the construction disclosed, and that the drawings and description are not to be construed as defining or limiting the scope of the invention, the claims forming a part of this specification being relied upon for that purpose.

In the drawings:

FIG. 1 is a top plan view of the apparatus of the present invention showing the die operatively associated with two extruders arranged to feed plastic material simultaneously into the die.

FIG. 2 is an enlarged view of the die block taken substantially along line 2—2 of FIG. 3 and partially broken away to show details of the die structure and insert arrangement.

Figure 3:
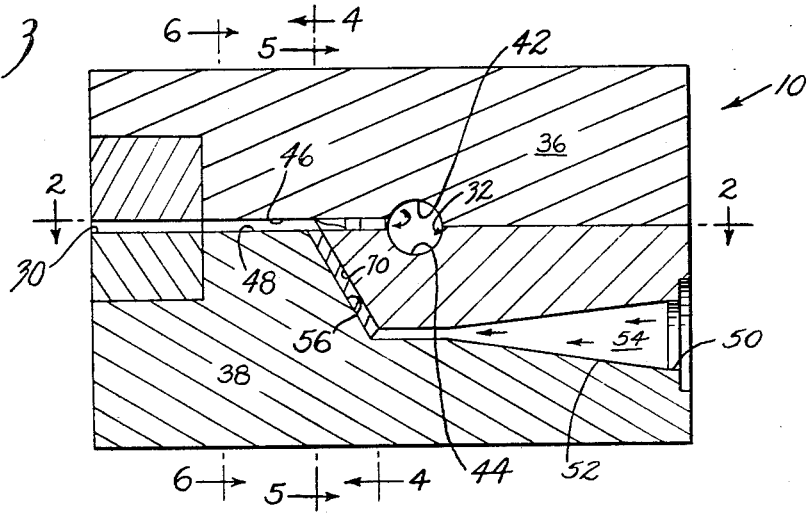
FIG. 3 is a vertical sectional view taken along line 3—3 of FIG. 2 showing the position of the inserts in the passages within the die.
Figure 4:
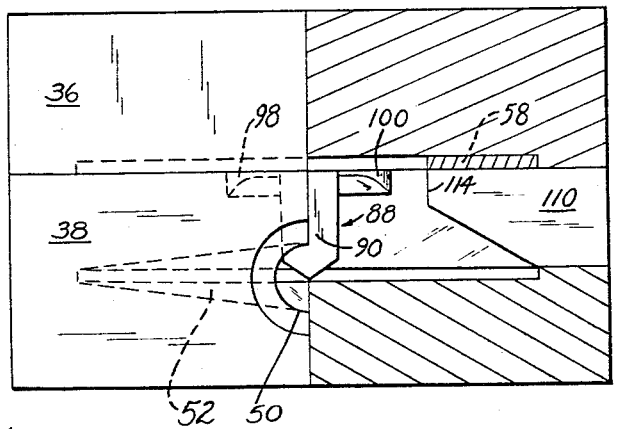
FIG. 4 is a vertical view partially in section taken along line 4—4 of FIG. 3 further illustrating the position of the inserts within the die.

Turning now to the drawings, FIG. 1 illustrates a general arrangement of one type of apparatus for feeding molten plastic under pressure, to a die assembly generally indicated by the numeral 10, by which a unitary strip 12 of multicolor plastic material may be produced. As shown, granulated or pelletized plastic material 14 and 16 fed from hoppers 18 and 20, respectively, is conveyed by conventional means, such as feed screw mechanisms, through separate conduits 22 and 24 from the extruders 8 and 9 to the die 10. As the plastic pellets travel through the conduits 22 and 24 they are heated by conventional means (not shown) to an elevated temperature so that the plastic from the hoppers enters the die in a molten state. The separate streams of molten plastic from conduits 22 and 24 converge within the die in a manner to be described whereby they may emerge therefrom as a single strip which upon cooling is normally rigid at ordinary room temperatures.

While the plastic material 14 and 16 may be of any desired colors, for purposes of illustration, the material designated by the numeral 14 is indicated as being transparent and colorless or clear; while that indicated by the numeral 16 is also transparent but having a substantially dense color tone.

Figure 8:
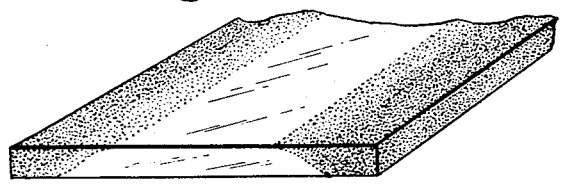
FIG. 8 is an enlarged fragmentary perspective view of a strip of plastic extruded in accordance with the present invention, reversed to show more clearly the gradient density effect accomplished by the present invention.

To obtain the strip shown in FIG. 8 of the drawing, material 14 is fed from extruder 8 through conduit 22 into the die 10 in a molten condition. It enters the die through an entrance port 26 arranged to communicate with the conduit 22 and a passage 28 which extends through the die from the entrance port 26 to the die mouth or exit 30. It can be seen from the drawings that the passage 28 comprises a transversely extending rear bore 32 which communicates with a forward or exit portion 34. The die assembly 10 essentially comprises an upper section 36 and a lower section 38, and the bore 32, as shown in the drawings, is formed by aligned recesses 42 and 44, semicircular in cross section, in the upper and lower die sections 36 and 38 respectively. The forward or exit portion 34 of the passage 28 is formed by a substantially rectangularly shaped cavity 46 formed in the under surface of the upper die section 36 and by the adjacent upper surface 48 of the lower die section 38. The exit portion 34 of the passage 28 is thus shown as having a rectangular cross section and as extending normal to the axis of the bore 32, terminating at the mouth 30 of the die.

As the molten plastic from extruder 8 is forced into and through the die assembly, plastic from extruder 9 is simultaneously fed through conduit 24 into the die, also in a molten state. It enters the die through a second entrance port 50 which communicates with conduit 24 and a second passage 52. As best seen in FIG. 3, the passage 52 extends between the port 50 and the passage 28, terminating at the intersection therewith, forwardly of the bore 32. Passage 52 formed in the lower section 38 of the die comprises a rear portion 54 and an upwardly inclined, forward section 56. As the rear portion 54 extends inwardly from the port 50 toward the inclined forward section 56, its opposed side walls flare sharply outwardly and its upper and lower walls converge whereby it becomes rectangular in cross section, having a transverse dimension substantially greater than its height and substantially equal to the transverse dimension of the exit or forward portion 34 of the passage 28. The forward or inclined section 56 of the second passage 52 is of substantially similar rectangular cross-sectional configuration and extends between and connects the rear portion 54 passage 52 with passage 28 as shown.

It is therefore apparent to one skilled in the art that molten plastic material from extruders 8 and 9 fed into the die assembly 10 through entrance ports 26 and 50, respectively, are thus caused to merge into a unitary stream of plastic exiting from the die at its mouth or exit 30.

In order to effect the design of the unitary strip 12 shown in FIG. 8, the present invention contemplates the use of removable inserts adjustably positionable within the passages 28 and 52 to direct and to restrict the flow of material therethrough.

Spaced, opposed inserts 58 and 60 are removably secured within the forward portion 34 of the passage 28 as shown in FIG. 2 and positioned adjacent to the bore 32 to restrict the flow of plastic 14 from extruder 8 as it flows from the bore 32 into the forward portion 34 of the die assembly. It can be seen from the drawings that the thickness of the inserts 58 and 60 is substantially identical to the height of the passage 28, effectively reducing the width of passage 28 through which molten plastic from extruder 8 might flow.

Each of the transversely spaced inserts 58 and 60 is formed with opposed, inwardly directed extensions 62 and 64 which terminate in spaced relation to restrict further the flow of plastic from extruder 8. It will be noted that the inserts are positioned within the portion 34 of passage 28 to lie forwardly of and adjacent to bore 32. With the inserts so disposed the extensions 62 and 64, however, as best seen in FIG. 2, are positioned with their forward edge surfaces 66 and 68 adjacent to the upper edge of the rear wall 70 of the inclined passage 56, forming an extension thereof. The forward edge surfaces are angularly related to the upper and lower surfaces of the inserts so that when the spacers are arranged as described, the surfaces 66 and 68 have the same angularity with respect to the surface 48 as does the passage 56.

Figure 5:
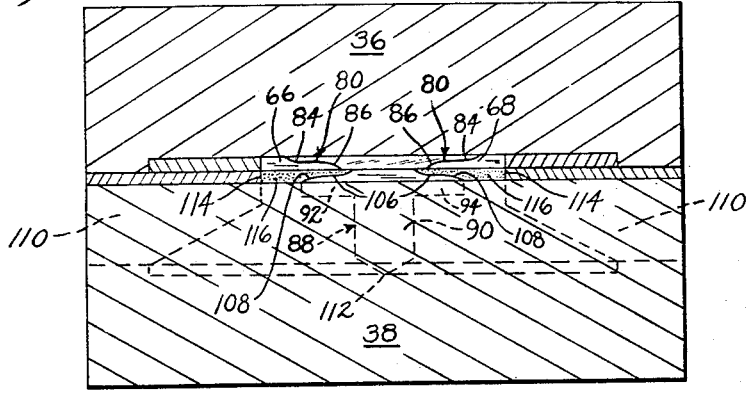
FIG. 5 is a sectional view taken along line 5—5 of FIG. 3 to illustrate further the cooperative action of the inserts in merging the two streams of molten plastic into a unitary stream of a predetermined design.
Figure 7:
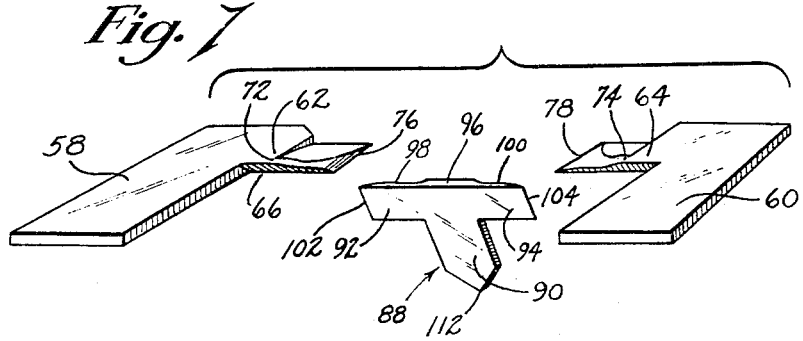
FIG. 7 is an exploded view, in perspective, illustrating the relative positions of the inserts.

The reduced terminal portions of extensions 62 and 64 are each configured, as shown in FIGS. 2, 5 and 7 to provide a decreasing flow restriction from an area of complete restriction as at 72 and 74 to an area of minimum or no restriction as at their terminal edges 76 and 78, respectively. Thus, it can be seen that the area of the passage lying between the terminal edges 76 and 78 is unobstructed by the inserts 58 and 60.

As shown in FIGS. 5 and 7, the extensions 62 and 64 are each formed with curvilinear surfaces 80 and 82, respectively, profiled to recede toward their terminal edges 72 and 74, respectively, a concave portion 84 and convex portion 86, the convex portions lying inwardly of the concave portions relative to the longitudinal center line of the die. It is readily apparent that the profiled surfaces function to reduce the cross-sectional area of the passage 28 and limit the flow of molten plastic therethrough.

Lying between the spaced inserts 58 and 60 and removably positioned within the forward section 56 of the second pasage 52, an intermediate insert 88 partially obstructs the flow of the plastic through passage 52 from extruder 9. As seen in the drawings, insert 88 is generally T-shaped having a central section or body portion 90 from which opposed arms 92 and 94 extend outwardly in opposite directions.

The upper end surface 96 of the insert 88 is angularly related to the upper and lower faces of the body portion 88 permitting the insert to be positioned within the section 56 of the second passage 52 with its end surface 96 coplanar with the upper surface 48 of the lower die section 38. The area of the passage 56 occupied by the body portion 90 is thus effectively blocked as the thickness of the insert is substantially identical to the height of the passage 56. The passage area occupied by the arms 92 and 94, however, is only partially obstructed as seen in FIG. 5, as the thickness of the upper surfaces 98 and 100, respectively, of the arms 92 and 94 recedes from a point of maximum thickness at the body 90 of the insert to a point of minimum thickness at their terminal edges 102 and 104, respectively. The receding surfaces 98 and 100 are each profiled to provide a concave portion 106 and a convex portion 108, the convex portion lying outwardly of the concave portion relative to the longitudinal center line of the die. Restrictors 110, 110 are positioned within the inclined passage 56 on opposite sides of the insert 88, and spaced from the terminal edges 102 and 104 of the extending arms 92 and 94, respectively, to conform the width of the inclined passage to the unobstructed width of passage 28 measured between the spaced inserts 58 and 60 forwardly of the extensions 62 and 64.

As extruders 8 and 9 simultaneously feed molten plastic into passages 28 and 52, respectively, the flow of material from extruder 8 passes from the bore 32 between inserts 58 and 60 which function to reduce the width of the stream of plastic and to shape the cross-sectional configuration thereof. The central portion of the stream of molten plastic is unobstructed by the inserts as the plastic flows therebetween, but the stream's longitudinal edge portions are partially obstructed by their flow over the profiled surfaces of the inwardly directed extensions 62 and 64 which cause the thickness of said edge portions to decrease from an area of maximum thickness to an area of minimum thickness along the longitudinal edges thereof.

The molten plastic fed into passage 52 from extruder 9 is divided as it enters the inclined passage 56 by the pointed, lower end 112 of the insert 88 and caused to flow as two substantially equal streams spaced on opposite sides of the insert and between the restrictors 110, 110. The outer longitudinal portions of the separate streams of plastic flow unobstructed between the inner edges 114 of the restrictors 110 and the terminal edges 102 and 104 of the extending arms 92 and 94 of the insert 88. However, the inner longitudinal edge portions of the separate streams of molten plastic pass over the profiled surfaces of the arms 92 and 94 which partially obstruct their flow through the passage 56 and cause the thickness thereof to diminish from an area of maximum thickness as at 116 to an area of minimum thickness along the edges of the streams which flow adjacent to the body 90 of the insert 98.

Figure 6:
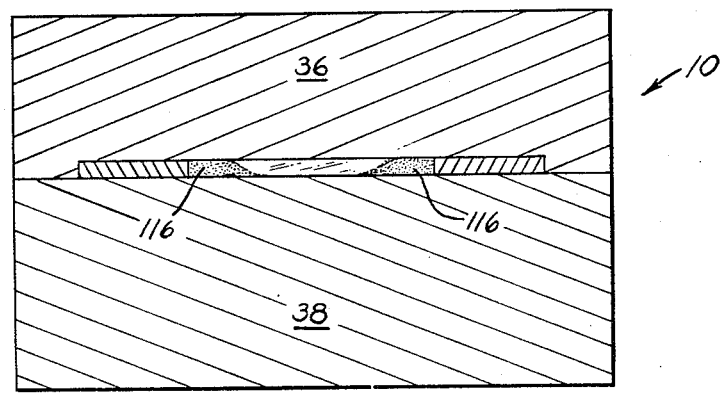
FIG. 6 is a sectional view taken along line 6—6 of FIG. 3.

As shown in FIGS. 2 and 5, the inserts 58 and 60 are equally spaced on opposite sides of the center line of insert 88, the inwardly directed extensions 62 and 64 overlying the extending arms 92 and 94 of insert 88 but terminating short of the body portion 90 thereof. It will be noted that the concave-convex surfaces of the extensions 62 and 64 are substantially in register with the convex-concave surfaces of the arms 92 and 94—the concave portions of each being substantially aligned with the convex portions of the other. With the inserts so arranged, the separate streams of molten plastic from extruders 8 and 9 merge in the forward portion 34 at the intersection of passages 28 and 52 to form a single stream, substantially rectangular in cross section, and configured as shown in FIG. 6. The unitary strip of plastic thus formed, see FIG. 8, comprises three separate longitudinal portions—a central longitudinal portion of clear plastic from extruder 8 and spaced longitudinal outer portions of colored plastic from extruder 9 disposed on opposite sides of the central portion. The outer longitudinal edge areas of the central portion which were directed over the upper insert extensions 62 and 64 overlay the inner longitudinal edge areas of the outer portions which were directed over the arms 92 and 94 of the intermediate insert. As the temperature of the molten plastic is elevated sufficiently to cause it to flow but is maintained below the point at which the separate streams would comingle, the joints between the central and outer portions of the unitary strip are therefore generally angularly related to the upper and lower surfaces of the merged strip, having substantially the same curvilinear configuration as the profiled surfaces of the inserts 58, 60 and 88, taken in cross section. The concave-convex profiling of the inserts permits the extrusion of a plastic strip of the type described in which the juncture of the separate streams of molten plastic is consistent throughout the strip. By arranging the inserts in the die as shown whereby plastic material flowing over the concave surfaces of the intermediate insert joins with material flowing over the convex surfaces of the upper, spaced inserts, and, similarly, material flowing over the convex surfaces of the intermediate insert joins with that flowing over the concave surfaces of the upper inserts, an even and regular distribution of material is obtained transversely across the sloping joints from the thickest sections of the separate streams of material to their thinnest sections.

It can be seen that a strip of material as described may be made of any length, the width and thickness being variable depending upon the size of the flow passages in the die. Also, by making the strip of two colors of transparent plastic, or as in the present case, of a clear and of a colored transparent plastic, a strip having transverse areas of variable density may be obtained. The surface area of densest color will of course be the area of maximum thickness of the colored plastic, the density of color decreasing as the thickness of colored plastic decreases.

It is apparent that by decreasing or increasing the slope of the overlapping streams of plastic, taken in cross section, the surface areas of variable density may be decreased or increased proportionately.

The invention claimed is:

1. An apparatus for making a unitary strip of plastic material including a first extruder and a second extruder, a die operatively associated with each of said extruders to receive molten plastic material therefrom, a first passage extending through said die and communicating with said first extruder, a second passage in said die communicating with said second extruder and with said first passage, an intersection within said die of said first and second passages permitting plastic material from said second extruder to flow through said second passage to join the flow of plastic material from said first extruder at said intersection whereby the separate streams of plastic material from both said extruders may merge to exit from said die in a common stream, at least one insert positioned in said first passage and having an inwardly directed extension disposed transversely of said first passage and receding in thickness transversely inwardly to provide transversely decreasing restriction of material flow from said first passage, and another insert positioned in said second passage and having an outwardly directed arm disposed transversely of said second passage and receding in thickness transversely outwardly and complementing said extension to provide transversely decreasing restriction of material flow from said second passage, said inserts being disposed adjacent to said intersection and cooperating with said passage and with each other to define a path of material flow across one surface of said extension and another path of material flow from said second passage between another surface of said extension and said arm to effect merger of the streams of plastic material flowing through said first and second passages to form a unitary strip having longitudinally extending overlapping portions intermediate the longitudinal edges thereof.

2. An apparatus for making a unitary strip of plastic material including a first extruder and a second extruder, a die operatively associated with each of said extruders to receive molten plastic material therefrom, a first passage extending through said die and communicating with said first extruder, a second passage in said die communicating with said second extruder and with said first passage, an intersection within said die of said first and second passages permitting plastic materials from said second extruder to flow through said second passage to join the flow of plastic material from said first extruder at said intersection whereby the separate streams of plastic materials from both extruders may merge to exit from said die in a common stream, a pair of spaced inserts positioned within said first passage, and another insert positioned within said second passage intermediate said spaced inserts relative to the direction of the flow of plastic through the die, said spaced inserts and said other insert being disposed adjacent said intersection and acting to restrict the flow of plastic material in said respective passages, and cooperative means associated with said spaced inserts and said other insert for effecting an overlapping merger of the streams of molten plastic material to form longitudinally extending overlapping portions in said strip intermediate the longitudinal edges thereof.

3. An apparatus as set forth in claim 2 wherein the said cooperative means includes profiled surfaces on said inserts, said profiled surfaces on the pair of spaced inserts being arranged in register with the profiled surfaces on the intermediate insert.

4. An apparatus as set forth in claim 3 wherein the pair of spaced inserts are arranged within the die spaced above the intermediate insert, the profiled surfaces of the spaced inserts overlying portions of the intermediate insert.

5. An apparatus as set forth in claim 3 wherein the said intermediate insert is formed with opposed arms extending outwardly from a central body portion, the said arms having profiled surfaces adapted to restrict the flow of plastic through said second passage and over said arms, the central body portion acting to prevent the flow of plastic thereover, in said passage between said opposed arms.

6. An apparatus as set forth in claim 5 including diverting means on said body portion to divert the flow of plastic through said second passage to flow on opposite sides of the body portion over the profiled surfaces of the extending arms to join the flow of plastic in the first passage as two spaced streams.

7. An apparatus as set forth in claim 4 wherein the profiled surfaces of said spaced and intermediate inserts are provided with convex areas and concave areas, the convex areas of the intermediate insert being arranged to cooperate with the concave areas of the spaced inserts and the concave areas of the upper inserts being arranged to cooperate with the convex areas of the spaced insert.

8. An apparatus for making a unitary strip of plastic material as set forth in claim 1 wherein said other surface forms an extension of a wall of said second passage.

9. An apparatus for making a unitary strip of plastic as set forth in claim 8 wherein said other surface intersects said one surface at the intersection of said first and second passages.

References Cited

UNITED STATES PATENTS

| Re. 26,237 | 7/1967 | Rowland. |
|---|---|---|
| 2,569,373 | 9/1951 | Fay. |
| 2,897,543 | 8/1959 | Weston et al. |
| 3,218,971 | 11/1965 | Rowland. |
| 3,268,970 | 8/1966 | Kelley et al. |

WILLIAM J. STEPHENSON, Primary Examiner